March 26, 1957  O. W. JOHNSON  2,786,350
GAS DETECTION APPARATUS
Filed May 19, 1954
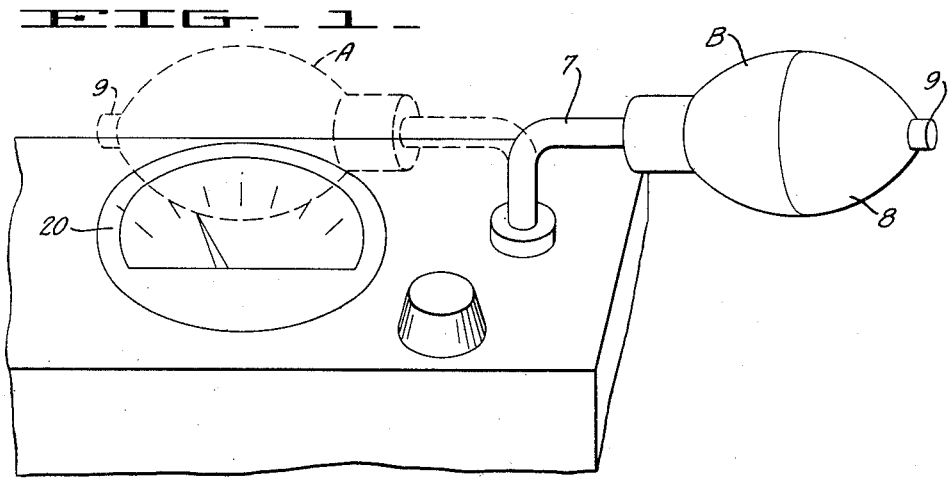
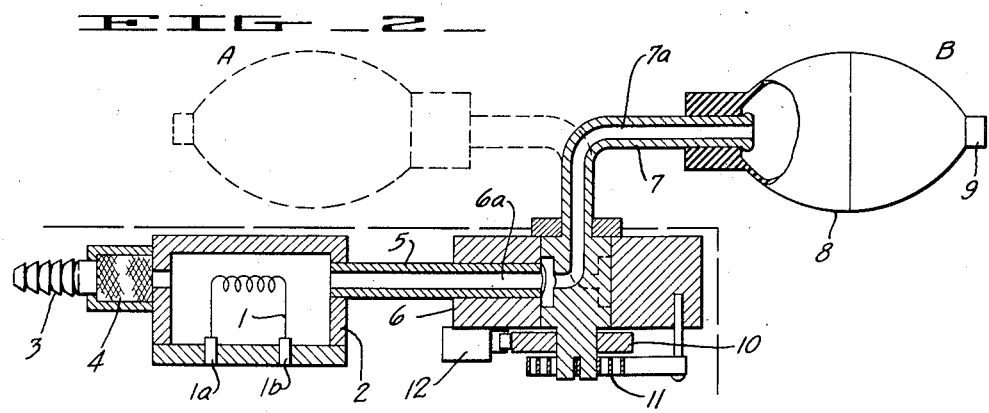
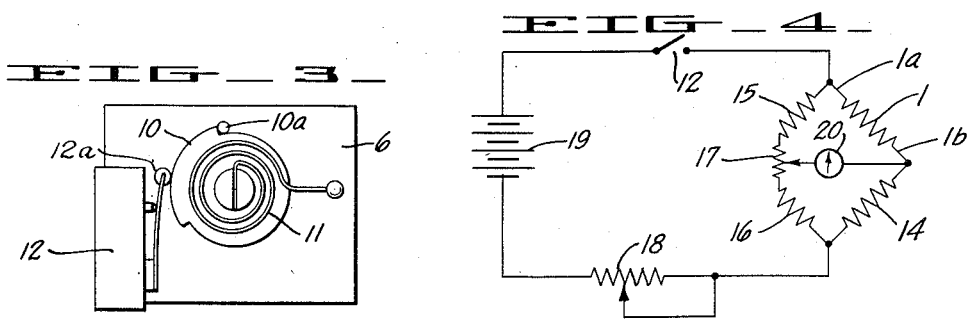
INVENTOR.
Oliver W. Johnson
ECKHOFF & SLICK, Attys.
BY
A member of the firm

United States Patent Office

2,786,350
Patented Mar. 26, 1957

2,786,350

GAS DETECTION APPARATUS

Oliver W. Johnson, Palo Alto, Calif., assignor to Johnson-Williams, Inc., a corporation of California Application May 19, 1954, Serial No. 430,893

3 Claims. (Cl. 73—27)

This invention relates to apparatus for measuring the concentration of vapors in the atmosphere. The invention is particularly adapted to that class of portable apparatus in which a gaseous sample is brought into contact with a hot wire for the purpose of affecting the temperature and electrical resistance of said wire, such change in resistance being related to the concentration of gas or vapor to be determined. However, as will be later apparent, the invention is readily adapted to many different types of gas analysis apparatus. Two typical instruments of the hot-wire type to which this invention might be applied are those instruments known as combustible gas indicators or flammable vapor detectors, in which the change in resistance is effected by catalytic combustion on or near the surface of a catalyst, such as a wire of the platinum metals group, and those instruments known as thermal conductivity gas analyzers, in which the resistance of the hot wire is affected by variations in thermal conductivity of the gaseous sample.

Instruments of the types cited above have been in use for many years, but their utility and reliability have been limited by the life of the batteries used to furnish the current for heating the sensing wire and for providing the indication, usually on a sensitive galvanometer. The life of the battery is relatively short due to the heavy current drain which must be taken from the dry cells (usually of the order of one ampere) and the reliability of the instrument is affected by the rapid change in terminal voltage observed as the battery is consumed, as will be familiar to those skilled in the art. Said change in terminal voltage affects the current passing through the measuring wire, which may in turn affect the initial balance and the sensitivity of the electrical measuring circuits, since it will be understood that there is only one ideal operating voltage and current for any given instrument while testing a given type of sample.

It is well-known that the actual time required for completion of a test with one of these instruments is very short, and that the greater part of the battery drain occurs between tests, due to failure of the operator to turn off the switch, either through forgetfulness or due to the inconvenience of repeatedly having to turn the instrument on and off.

Further, an unskilled operator might obtain a false reading due to failure to turn on the switch. In addition, there is always a possibility of injuring the instrument by drawing gas over a cold filament.

It is an object of this invention to prolong the life of the battery, as used in instruments of the type described above, by providing a switch which will automatically turn on a battery or other current when needed, and will turn it off at the completion of the test without the necessity of a separate manual operation by the user.

It is a further object of this invention to improve the accuracy and reliability of such instruments by provision of such automatic shut-off, to prevent large changes in the operating voltage and current during testing, due to failure of the operator to shut the instrument off between readings.

Still another object is to prevent damage to the instrument case and internal parts by corrosion from discharged dry cells, due to failure of the operator to shut off the current at the completion of testing.

Still another object is to increase the life of the hot wire sensitive element by limiting its energization to those periods when it is actually in use.

Another object is to provide a device wherein it is impossible to draw in gas over a cold filament.

In view of the above, it will be understood that my invention includes the use of an automatic switch which turns on the current in the instrument at the beginning of a test, and which turns off the current at the end of a test, such switch being actuated by the act of positioning the aspirator bulb preparatory to drawing a sample through the instrument, as will be apparent from the following detailed illustration and description.

Referring to the drawings:

Figure 1 is a partial perspective view of a device embodying the present invention.

Figure 2 is a sectional view showing certain of the parts of the device.

Figure 3 is a bottom view of the spring, cam and switch of Figure 2.

Figure 4 is a schematic diagram of the circuit employed.

Referring now to the drawings by reference characters, filament 1 consists of a fine wire of a material having a high temperature coefficient such as platinum, with appropriate insulated terminals 1a and 1b. Terminals 1a and 1b are connected into a measuring circuit such as a Wheatstone bridge circuit, as indicated in Figure 4, powered from batteries.

The aspirator bulb 8 is connected to hollow elbow 7, and elbow 7 turns in a bearing in block 6. A spring 11 continually urges elbow 7 in a clockwise direction (viewed from bottom as in Figure 3, and elbow 7 is held in position A by action of cam 10 in bearing against stop 10a. With the elbow in this position, passage 6a in the block 6 does not communicate with passage 7a in elbow 7. Further, the bulb B obscures the meter 20, so it is immediately apparent that the device is in an inoperative position.

When bulb 8 is grasped and elbow 7 rotated counterclockwise (viewed from bottom) to swing bulb into normal operating position B, passage 7a is brought into alignment with passage 6a. In this position, when bulb 8 is squeezed, air in the bulb will be discharged through check valve 9, and when bulb is released, atmosphere in chamber 2 and connector tube 5 will be drawn into the bulb by the vacuum produced by relaxation of the bulb. By repeated operations of the bulb, sample for analysis will be drawn from an outside source, through inlet tube 3, flame arrestor 4, and into chamber 2, where it can react on the filament 1.

As bulb 8 is swung from position A to position B, the low portion of cam 10 comes opposite roller 12a of normally closed snap action switch 12, permitting switch 12 to return to its closed position, energizing the electrical circuit.

It will be apparent that as long as bulb 8 is held in position B by the hand of the operator, the electrical circuit will be energized and alternate squeezing and relaxing of the bulb will cause a flow of sample through the analysis cell.

If the operator removes his hand from bulb 8, spring 11 will cause elbow 7 and cam 10 to rotate clockwise until cam 10 comes to a rest against stop 10a. In so rotating, the high part of cam 10 will come opposite roller 12a of switch 12, moving switch to the open position and cutting off current from the batteries. Thus, it will be impossible to leave the switch in the energized position unintentionally, with resultant unnecessary consumption of batteries.

Figure 4 illustrates a typical electrical circuit which may be used in conjunction with my invention. The batteries 19 provide current, through switch 12 and rheostat 13 to the Wheatstone bridge circuit formed by resistances 14, 15, 16 and 17, and the measuring wire, which is designated 1 in Figure 4. The Wheatstone bridge balance is effected by potentiometer 17, and indicated on indicator meter 20. The action of gas on the sample causes the resistance of resistance 1 to change, unbalancing the bridge in an amount proportional to the percentage of gas in the sample, as indicated on meter 20.

It will be apparent that other methods of construction are possible, the invention being defined in the claims appended, and not restricted to the specific design illustrated. In particular, it should be mentioned that the axis of rotation of elbow 7 is not necessarily restricted to the vertical position, as illustrated, but may also be disposed in other positions, particularly the horizontal. The switch may be of normally open construction, with an appropriate change in the cam.

I claim:

1. In a gas analysis instrument of the electric hot wire type having an electrical circuit for energizing a hot wire and an electric switch in said circuit for turning said circuit on and off, said instrument having means for drawing a gas sample into the instrument by means of a bulb, the improvement comprising a hollow arm extending from the bulb to the balance of the instrument, a swinging connection between the arm and the balance of the instrument, spring means whereby the arm is normally biased to a first position and wherein the arm can be swung and manually held in a second position and wherein the arm will return to the first position upon being released, means connecting said arm to said switch whereby the electric switch is actuated by movement of the arm, said switch being open when the arm is in the first position and said switch being closed when the arm is in the second position.

2. In a gas analysis instrument of the electric hot wire type having an electrical circuit for energizing a hot wire and an electric switch in said circuit for turning said circuit on and off, said instrument having means for drawing a gas sample into the instrument by means of a bulb, the improvement comprising a hollow arm extending from the bulb to the balance of the instrument, a swinging connection between the arm and the balance of the instrument, spring means whereby the arm is normally biased to a first position and wherein the arm can be swung and manually held in a second position and wherein the arm will return to the first position upon being released, means connecting said arm to said switch whereby the electric switch is actuated by movement of the arm, said switch being open when the arm is in the first position and said switch being closed when the arm is in the second position, said instrument having a fluid path in the arm between the bulb and a sampling chamber within the instrument, a valve in said arm whereby said valve is closed when the arm is in the first position and open when the arm is in the second position.

3. In a gas analysis instrument of the electric hot wire type having an electrical circuit for energizing a hot wire and an electric switch in said circuit for turning said circuit on and off, said instrument having means for drawing a gas sample into the instrument by means of a bulb, the improvement comprising a hollow arm extending from the bulb to the balance of the instrument, a swinging connection between the arm and the balance of the instrument, spring means whereby the arm is normally biased to a first position and wherein the arm can be swung and manually held in a second position and wherein the arm will return to the first position upon being released, means connecting said arm to said switch whereby the electric switch is actuated by movement of the arm, said switch being open when the arm is in the first position and said switch being closed when the arm is in the second position, said instrument having an indicating meter thereon and wherein the arm holds the bulb in such a position that said meter is obscured when the arm is in the first position and wherein said arm swings the bulb to a position wherein the meter is revealed when in the second position.

References Cited in the file of this patent

UNITED STATES PATENTS

| | | |
|---|---|---|
| 1,977,481 | Jones | Oct. 16, 1934 |
| 2,273,981 | Morgan et al. | Feb. 24, 1942 |
| 2,404,993 | Sullivan | July 30, 1946 |
| 2,546,273 | Poole | Mar. 27, 1951 |
| 2,618,150 | Willenborg | Nov. 18, 1952 |
| 2,720,108 | Johnson | Oct. 11, 1955 |

FOREIGN PATENTS

| | | |
|---|---|---|
| 522,942 | Great Britain | July 2, 1940 |
| 449,502 | Germany | Sept. 14, 1927 |